United States Patent
Shin et al.

(10) Patent No.: US 11,618,471 B2
(45) Date of Patent: Apr. 4, 2023

(54) VEHICLE CONTROL DEVICE AND CONTROL METHOD THEREOF

(71) Applicant: LG Electronics Inc., Seoul (KR)

(72) Inventors: Wonho Shin, Seoul (KR); Jichan Maeng, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/490,121

(22) PCT Filed: Apr. 19, 2019

(86) PCT No.: PCT/KR2019/004751
§ 371 (c)(1),
(2) Date: Aug. 30, 2019

(87) PCT Pub. No.: WO2020/213771
PCT Pub. Date: Oct. 22, 2020

(65) Prior Publication Data
US 2022/0055648 A1 Feb. 24, 2022

(51) Int. Cl.
*B60W 60/00* (2020.01)
*B60W 30/08* (2012.01)
(Continued)

(52) U.S. Cl.
CPC .......... *B60W 60/001* (2020.02); *B60W 30/08* (2013.01); *G01C 21/3484* (2013.01);
(Continued)

(58) Field of Classification Search
CPC .............. B60W 60/001; B60W 30/08; B60W 2556/10; B60W 30/14; B60W 40/08;
(Continued)

(56) References Cited

U.S. PATENT DOCUMENTS

| 2013/0158866 A1* | 6/2013 | Weir ................ G01C 21/3617 |
| | | 701/468 |
| 2013/0238241 A1 | 9/2013 | Chelotti et al. |

(Continued)

FOREIGN PATENT DOCUMENTS

| JP | 2000266562 | 9/2000 |
| JP | 2013096940 | 5/2013 |

(Continued)

*Primary Examiner* — Nicholas Kiswanto
*Assistant Examiner* — Jamal A Shah
(74) *Attorney, Agent, or Firm* — Fish & Richardson P.C.

(57) ABSTRACT

The present invention relates to an artificial intelligent vehicle, and to a vehicle control device and a control method thereof estimating and recommending a destination of a driver boarded on a vehicle, including: a memory including driving path information of the vehicle, and when an engine of the vehicle is started, among the travel path information, a processor detecting at least one first driving path information based on a location of the vehicle and a time at which the engine is started, calculating an estimated probability for each of the first destinations extracted from each of the first driving path information, and controlling the vehicle so that at least one of the first destinations is output as an estimated destination based on the calculated estimated probability.

17 Claims, 14 Drawing Sheets

(51) Int. Cl.
  *G01C 21/34* (2006.01)
  *B60W 30/14* (2006.01)
  *B60W 40/08* (2012.01)

(52) U.S. Cl.
  CPC ............. *B60W 30/14* (2013.01); *B60W 40/08* (2013.01); *B60W 2510/06* (2013.01); *B60W 2520/10* (2013.01); *B60W 2520/12* (2013.01); *B60W 2556/10* (2020.02)

(58) Field of Classification Search
  CPC ......... B60W 2510/06; B60W 2520/10; B60W 2520/12; G01C 21/3484
  See application file for complete search history.

(56) References Cited

U.S. PATENT DOCUMENTS

| | | | | |
|---|---|---|---|---|
| 2016/0033291 | A1* | 2/2016 | Inoue | G01C 21/3617 701/408 |
| 2019/0130516 | A1* | 5/2019 | Matsushima | G06Q 50/30 |

FOREIGN PATENT DOCUMENTS

| | | |
|---|---|---|
| KR | 101569021 | 11/2015 |
| KR | 20180100824 | 9/2018 |

* cited by examiner

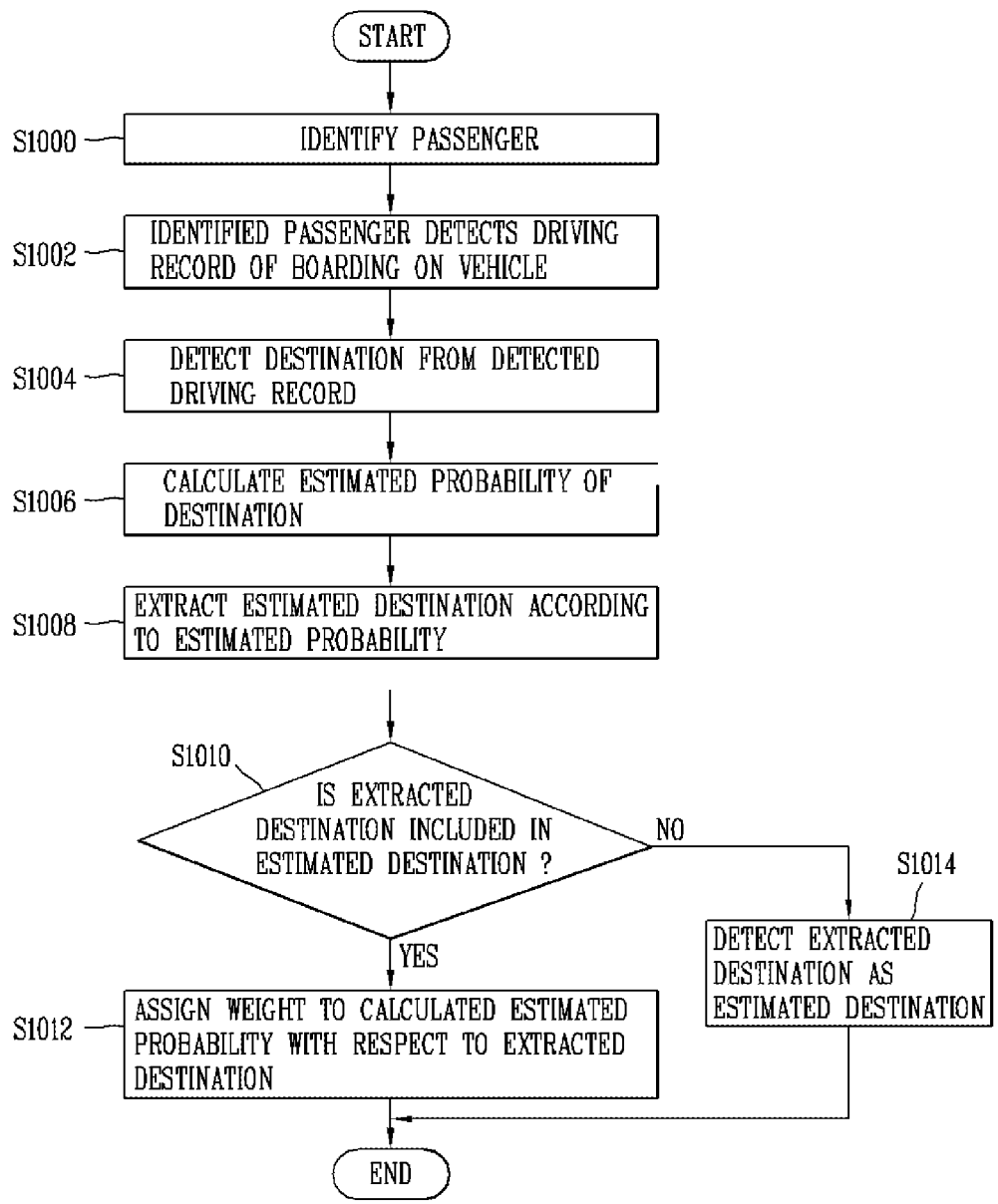

FIG. 13
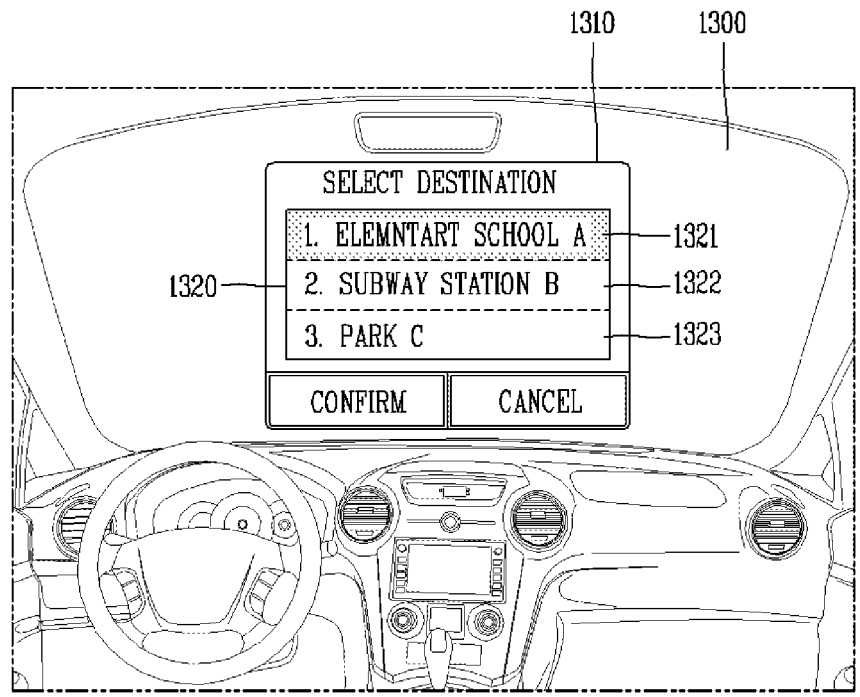
(a)
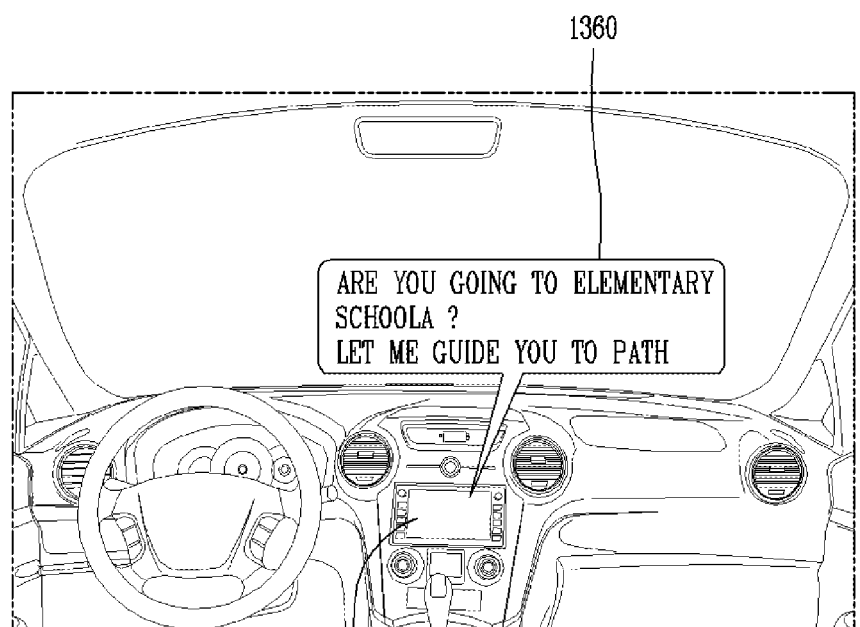
(b)

FIG. 14
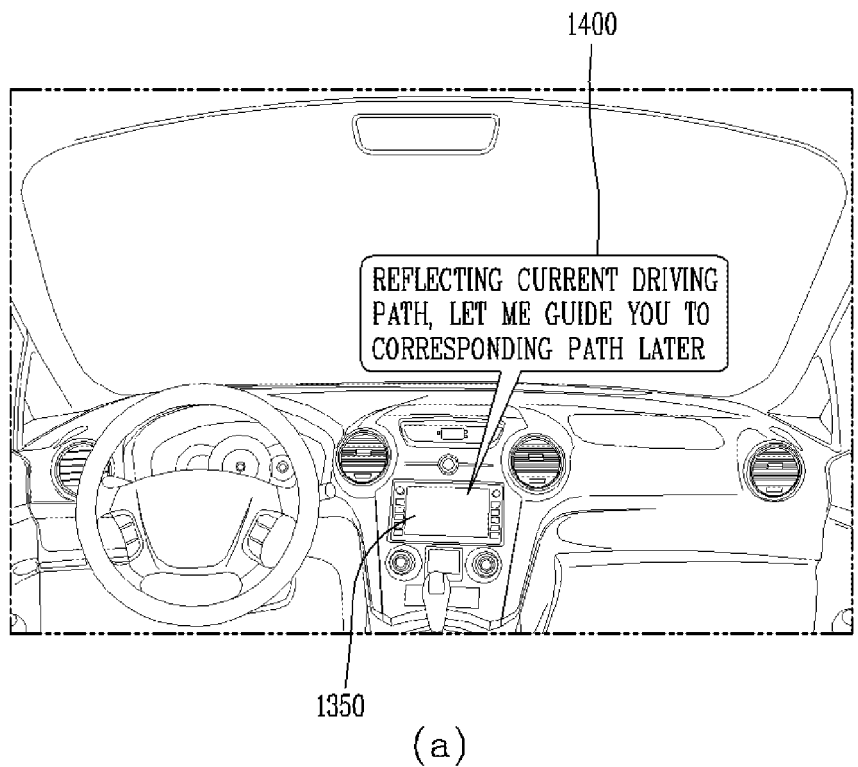
(a)
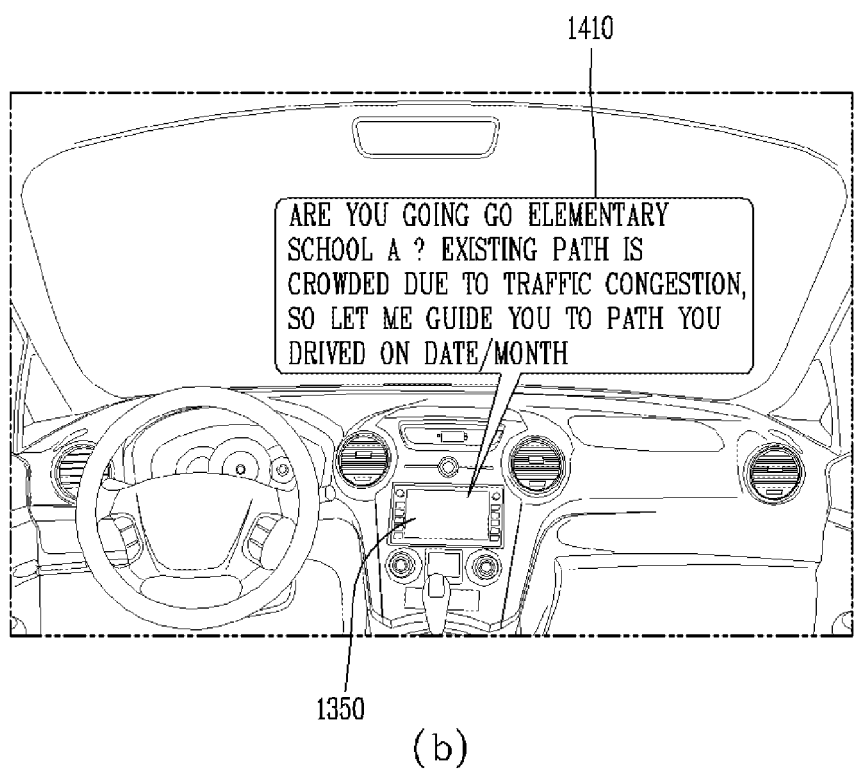
(b)

VEHICLE CONTROL DEVICE AND CONTROL METHOD THEREOF

CROSS-REFERENCE TO RELATED APPLICATIONS

This application is a National Stage application under 35 U.S.C. § 371 of International Application No. PCT/KR2019/004751, filed on Apr. 19, 2019, which is incorporated by reference.

TECHNICAL FIELD

The present invention relates to an artificial intelligent vehicle, and to a method for estimating and recommending a destination of a driver boarded on a vehicle.

BACKGROUND ART

A vehicle is an apparatus capable of moving a user in the user-desired direction. A representative example of a vehicle may be an automobile.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

The vehicle may be included in a transportation means. The transportation means may refer to the means that a person use to move or carry luggage, and for example, may include an automobile, a motorcycle, a bicycle, a train, a bus or a tram. A content related to the vehicle described in the present specification may be applied by analogy to all kinds of transportation means the same/similarly.

Meanwhile, recently, a study on artificial intelligence (AI) has been conducted actively. In addition, a vehicle that may be used more conveniently by a user by combining the artificial intelligence and the vehicle has been studied. Further, as part of such a study, a vehicle such as an autonomous vehicle has been emerging.

As a part of such artificial intelligence study, a study on a vehicle that may predict intention of a driver and may be operated according to the predicted intention of the driver has been conducted actively.

DISCLOSURE

Technical Problem

The present invention is directed to providing a control device for a vehicle, capable of automatically detecting a destination even when a driver does not designate the destination directly and providing path information to the detected destination, and a control method thereof.

In addition, the present invention is directed to providing a vehicle capable of detecting a destination according to intention of a driver and providing path information according to the detected destination when the driver operates the vehicle on a path different from driving path information provided based on a set destination, and a control method thereof.

Technical Solution

In order to achieve the above-described object, a vehicle control device according to an embodiment of the present invention, including: a memory including driving path information of the vehicle, and when an engine of the vehicle is started, a processor detecting at least one piece of first driving path information among the travel path information based on a location of the vehicle and a time at which the engine is started, calculating an estimated probability for each of first destinations extracted from each piece of the first driving path information, and controlling the vehicle so that at least one of the first destinations is output as an estimated destination based on the calculated estimated probability.

In one embodiment, the processor estimated destination controls the vehicle so that any one piece of path information according to selections of a driver is output among the output estimated destinations, and controls the vehicle so that a result of re-estimating a destination according to a result of comparing the driving path of the vehicle to the path according to the output path information is output.

In one embodiment, the processor performs re-estimation of the destination based on second driving path information including a result of analyzing the driving path of the vehicle among the driving path information.

In one embodiment, the result of analyzing the driving path of the vehicle includes information on a driving trajectory of the vehicle for a predetermined time, and points in which the vehicle is parked or stopped.

In one embodiment, when the estimated destination is one, the processor controls the vehicle so that path information related to the estimated destination together with notification information for notifying the estimated destination is provided.

In one embodiment, when the estimated destination is in plural, the processor controls the vehicle so that the plurality of estimated destinations are output in descending order of the estimated probability calculated for each of the plurality of estimated destinations.

In one embodiment, when any one of the first destination has an estimated probability higher estimated probability than a predetermined level compared to other destinations, the processor may control the vehicle so that only the one first destination is output as the estimated destination.

In one embodiment, the processor controls the vehicle so that at least one of the first destinations having an estimated probability equal to or greater than a predetermined minimum level is output as the estimated destination.

In one embodiment, the processor detects whether a passenger of a driver is present in the vehicle, when there is the passenger, identifies the passenger, and detects a second driving path information when the identified passenger is boarded on the vehicle among the driving path information, and calculates an estimated probability corresponding to each of second destinations extracted from the second driving path information, and detects at least one of the second destinations based on the calculated estimated probability, and controls the vehicle so as to further output the detected destination as the estimated destination.

In one embodiment, the processor acquires schedule information of a driver of the vehicle, extracts a destination included in the acquired schedule information, and controls the vehicle so that the extracted destination is further output as the estimated destination.

In one embodiment, the processor further outputs the detected destination as the estimated destination according to whether the detected destination is included in the estimated destination, or assigns a predetermined weight to an estimated probability of the estimated destination corresponding to the detected destination.

In one embodiment, when driving of the vehicle is completed, the processor compares a first path according to path information output according to a set departure point and a destination and a second path in which the vehicle drives from the departure point to the destination, and when the first path and the second path is different from each other as result of the comparison, based on a driving efficiency degree calculated respectively from the first and second paths, changes the path information according to the departure point and the destination to reflect the second path.

In one embodiment, the processor calculates the driving efficiency degree based on at least one of a time required for driving from the departure point to the destination, a fuel consumption amount, and driving difficulty according to road characteristics from the departure point to the destination.

In one embodiment, the processor assigns a higher estimated probability weight to a destination of which a departure point or a departure time, among the driving path information, is extracted from the driving path information closer to a location of the vehicle and a time when the engine is started.

In one embodiment, the driving path information is stored separately for each driver of the vehicle, and the processor controls the vehicle so that the driver of the vehicle is identified, the estimated destination based on driving path information corresponding to the identified driver is detected, and the detected estimated destination is output.

In one embodiment, when a state of the vehicle satisfies a predetermined condition, the processor controls the vehicle so that a result of re-estimating the destination is output, and the state of the vehicle that satisfies the predetermined condition is at least one state among a state in which the vehicle is stopped, a state in which the vehicle is operated at a speed lower than a predetermined level, and a state in which an object of which probability of collision is higher than or equal to a predetermined level does not exist among objects detected from the periphery of the vehicle.

In order to achieve the above-described object, a control method of a vehicle control device, including: when an engine of the vehicle is started, detecting a location of the vehicle and a time when the engine is started, detecting at least one piece of previously stored driving path information of the vehicle based on the detected location of the vehicle and the time at which the engine is started, extracting destinations from each of the at least one piece of detected driving path information, outputting at least one of the extracted destinations as an estimated destination based on a calculated estimated probability with respect to each of the extracted destinations, and controlling the vehicle so that path information corresponding to any one of the at least one estimated destination is output.

In one embodiment of the present invention, a control method of a vehicle control device further including: comparing a path according to the path information with a path at which the vehicle is driven, according to the path comparison result, analyzing the driving path of the vehicle and extracting driving path information including the analysis result from the previously stored driving path information, re-extracting destinations from each piece of the driving path information including the analysis result, and controlling the vehicle so that at least one of the re-extracted destinations is re-output as the estimated destination.

Advantageous Effect

According to an embodiment of the present invention, there is one or more of following effects.

A vehicle control device according to one embodiment of the present invention detects at least one estimated destination based on a previously stored vehicle driving record and provides automatically path information with respect to the detected at least one estimated destination so that there is an effect that a driver does not need to set a destination directly.

In addition, a vehicle control device according to one embodiment of the present invention, when a driver operates the vehicle on a different path from driving path information provided based on a set destination, detects a destination automatically according to a driving path of the vehicle and provides path information on the detected destination, and thus there is an effect that the driver does not need to change the destination in order to receive a driving path according to the changed destination.

BRIEF DESCRIPTION OF THE DRAWINGS

FIG. 10 is a flowchart illustrating an operation process in which a vehicle control device according to an embodiment of the present invention detects an estimated destination based on a result of identifying a passenger.

FIG. 13 is an illustrative view illustrating examples of providing information on an estimated destination to a driver in a vehicle according to an embodiment of the present invention.

FIG. 14 is an illustrative view illustrating examples of changing driving path information according to a driving path of a vehicle and providing path guidance based on changed driving path information in a vehicle according to an embodiment of the present invention.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
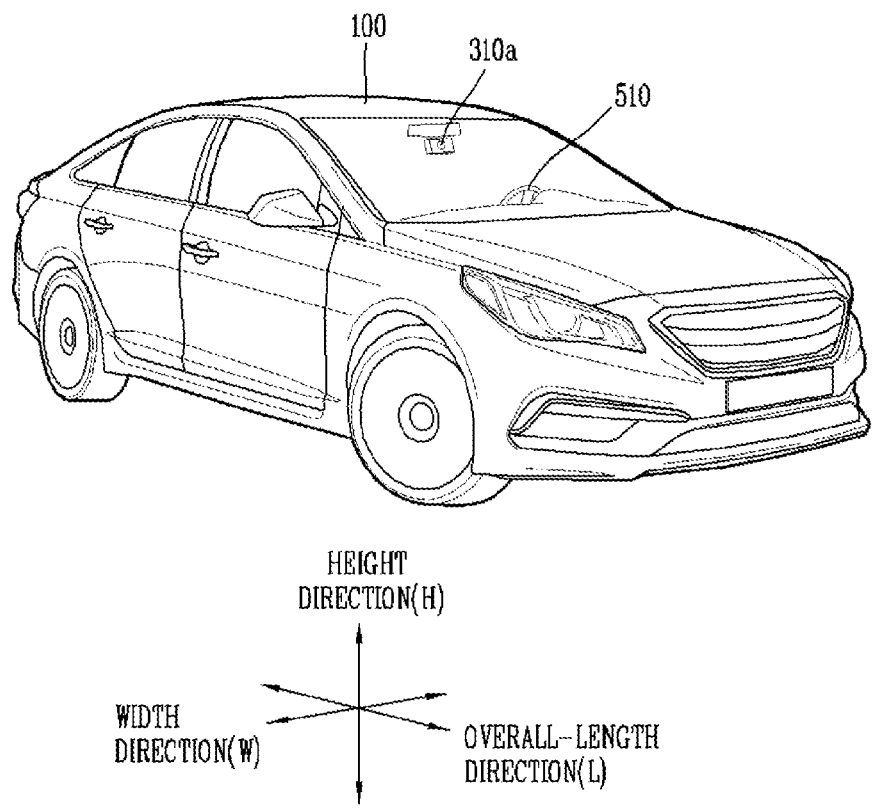
FIG. 1 is a view illustrating appearance of a vehicle in accordance with an embodiment of the present invention.

FIG. 1 is a view illustrating appearance of a vehicle in accordance with an embodiment of the present invention.

Figure 2:
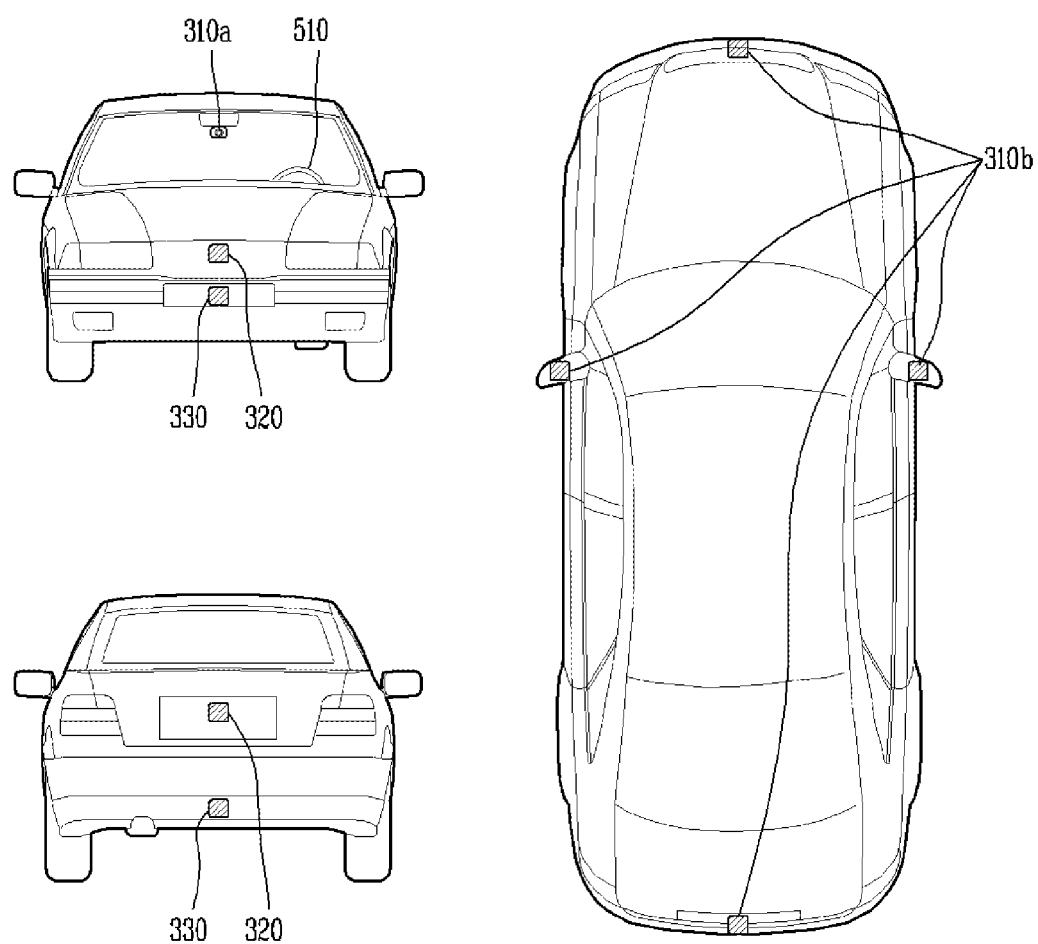
FIG. 2 is a view illustrating appearance of a vehicle at various angles in accordance with an embodiment of the present invention.

FIG. 2 is a view illustrating appearance of a vehicle at various angles in accordance with an embodiment of the present invention.

Figure 3:
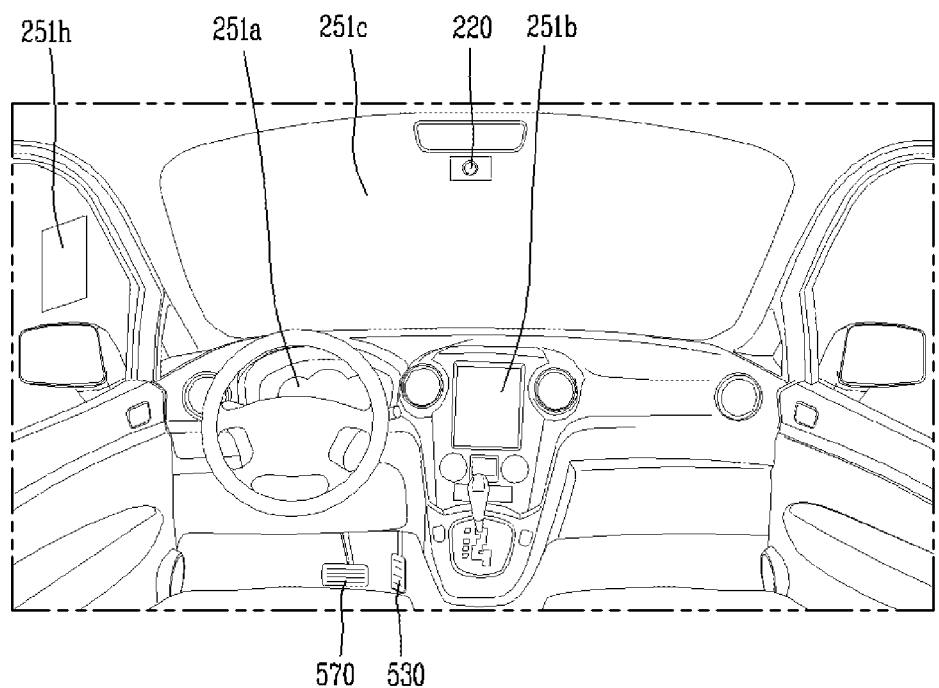
FIGS. 3 and 4 are views illustrating an inside of a vehicle in accordance with an embodiment of the present invention.
Figure 4:
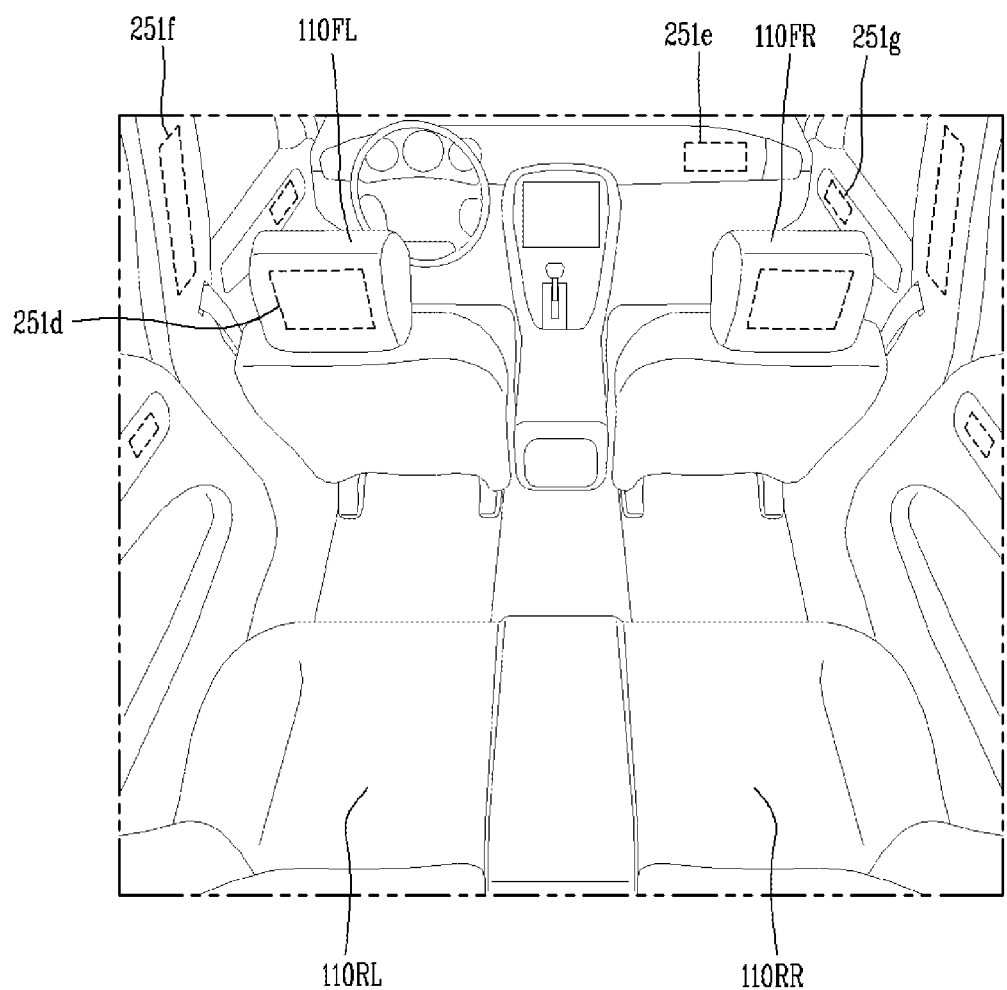

FIGS. 3 and 4 are views illustrating an inside of a vehicle in accordance with an embodiment of the present invention.

Figure 5:
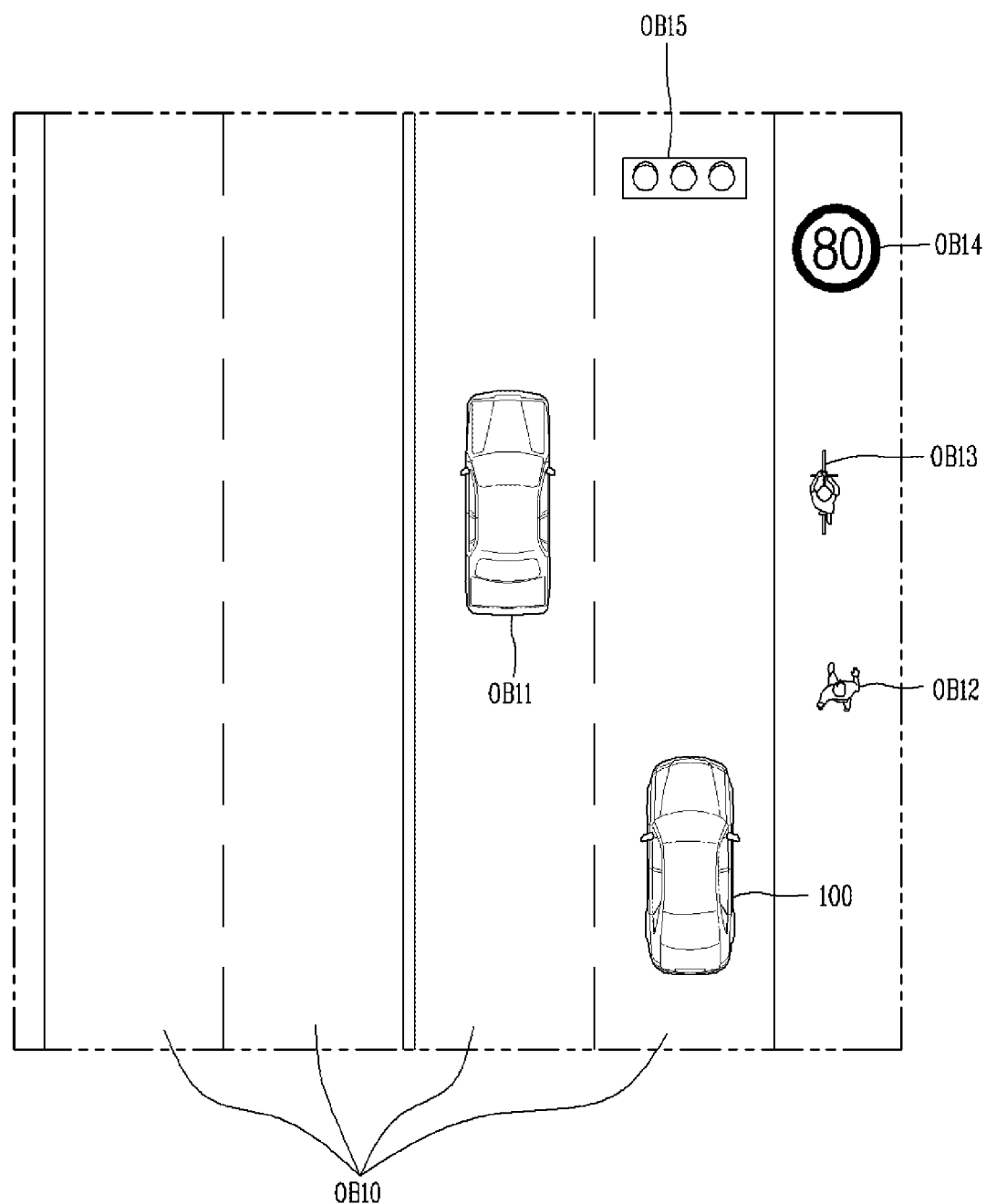
FIGS. 5 and 6 are reference views illustrating objects in accordance with an embodiment of the present invention.
Figure 6:
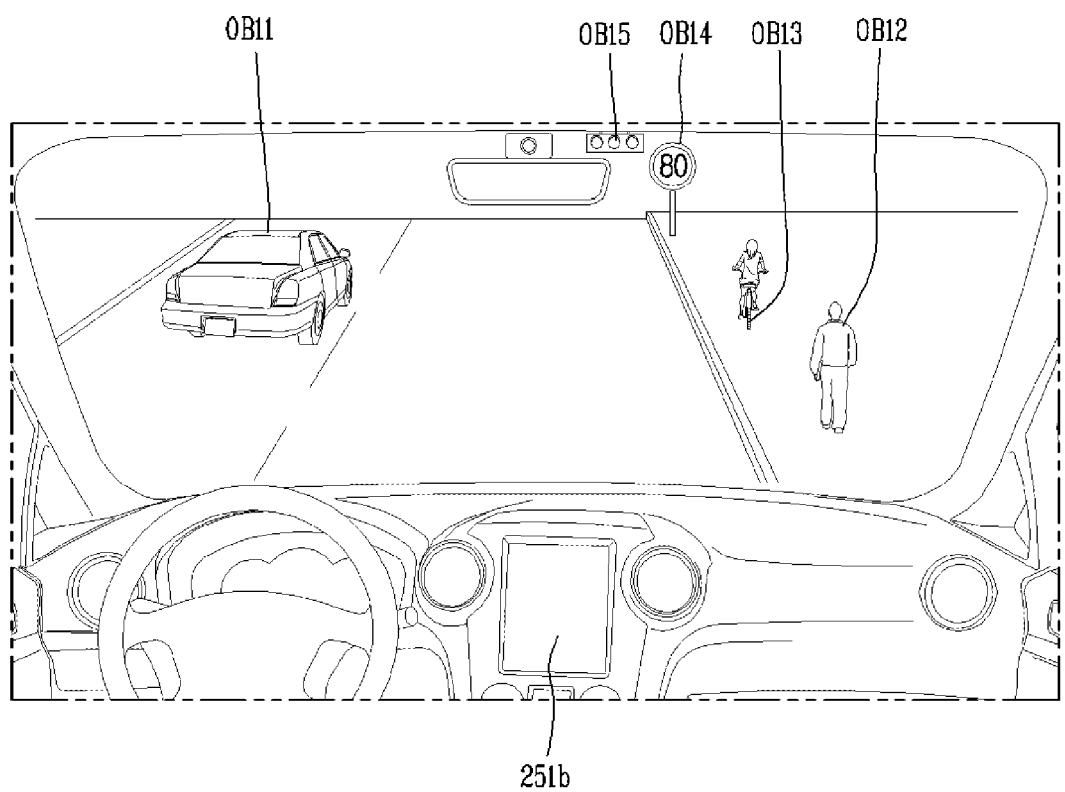

FIGS. 5 and 6 are reference views illustrating objects in accordance with an embodiment of the present invention.

Figure 7:
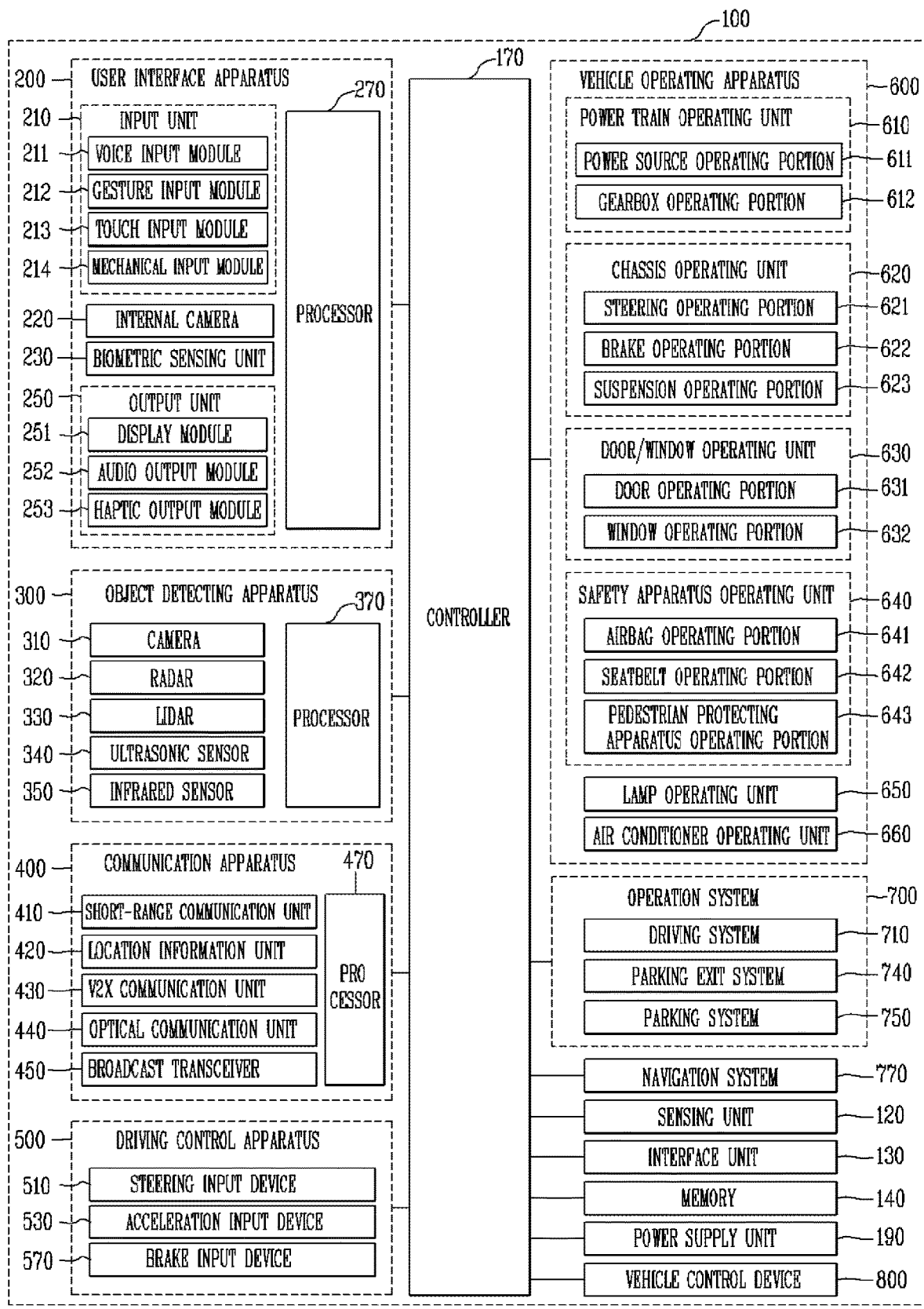
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300. The processor 370 may detect an object based on an acquired image, and track the object.

The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle or server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, a light-emitting unit may be integrally formed with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto.

Meanwhile, the interface unit 130 may serve as a path for supplying electric energy to the connected device. When a device is electrically connected to the interface unit 130, the interface unit 130 supplies electric energy supplied from a power supply unit to the connected device according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 860 may supply power required for an operation of each component according to the control of the controller 170. Specifically, the power supply unit 860 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The contents related to the vehicle 100 described in FIGS. 1 to 7 may be included in the vehicle 100 described below. That is, the vehicle 100 related to the present invention may include at least one of the components described in FIGS. 1 to 7.

Meanwhile, the vehicle control device 800 may be a device connected to the vehicle 100, and may be a device connected to the controller 170 and transmitting a signal for controlling the controller 170 so as to control the vehicle 100. Hereinafter, as described above, transmission of a control signal from the vehicle control device 800 to the controller 170 of the vehicle 100 in order to control the vehicle 100 will be described as the vehicle 100 being controlled by the vehicle control device 800.

The vehicle control device 800 may include a processor (not shown) for controlling an overall operation and a function of the vehicle control device 800, and may include a memory (not shown) including various data necessary for the operation of the processor (not shown).

The vehicle control device 800 according to an embodiment of the present invention may determine that the vehicle 100 starts to be operated when an engine of the vehicle 100 is started. In addition, when operation of the vehicle 100 is started, at least one expected destination may be estimated based on a driving record of the vehicle 100, and the vehicle 100 may be controlled so as to provide information on the estimated destination to a user. Alternatively, the vehicle control device 800 may control the vehicle 100 so that a destination according to a result of analyzing the driving path of the vehicle 100 is estimated and information on the estimated destination is provided to the driver. Accordingly, even when the driver does not set the destination directly, the vehicle control device 800 according to an embodiment of the present invention may estimate the destination based on a time and a location at which the engine is started, and the driving path information with respect to the estimated destination may be provided to the driver.

Hereinafter, an operation process of the vehicle control device 800 according to an embodiment of the present invention will be described in detail with reference to the accompanying drawings.

Figure 8:
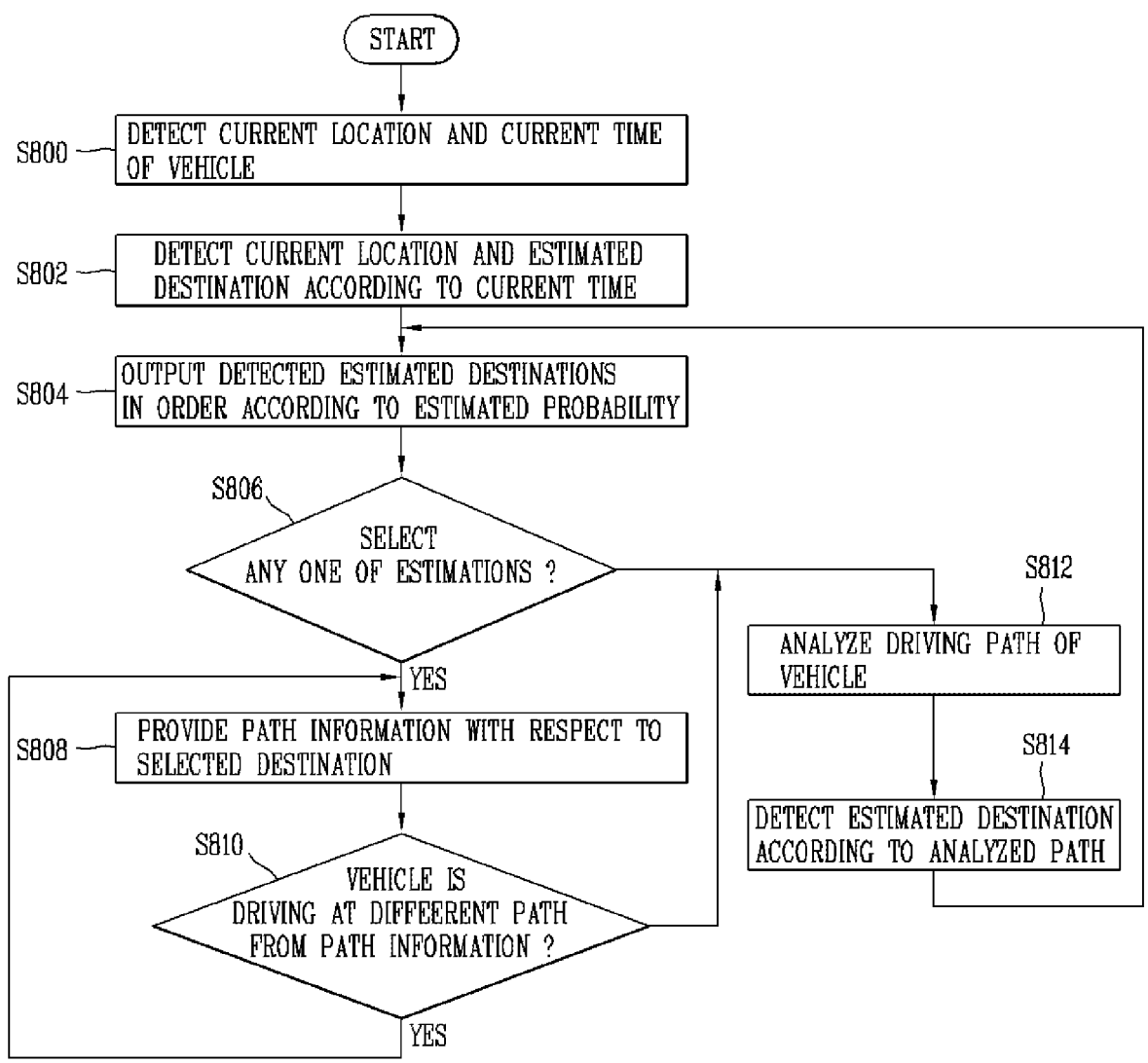
FIG. 8 is a flowchart illustrating an operation process of a vehicle control device for controlling a vehicle according to an embodiment of the present invention.

FIG. 8 is a flowchart illustrating an operation process of a vehicle control device for controlling a vehicle according to an embodiment of the present invention.

Referring to FIG. 8, first, when an engine of the vehicle 100 is started, the vehicle control device 800 may detect a current location and time of the vehicle 100 (S800). For example, the vehicle control device 800 may identify the current location via a location identification module that has previously been set, such as a GPS module, or may detect the current location based on a destination of the most recently stored driving record. Meanwhile, the current time may be the time at which the engine of the vehicle 100 is started.

When the current location and the current time of the vehicle 100 are detected at step S800, the vehicle control device 800 may estimate at least one destination based on previously stored driving records and the current location and the current time detected at step S800 (S802). For example, the vehicle control device 800 may detect a driving record corresponding to the current location in which a departure point is detected at the step S800 and a driving record corresponding to the current time at which a departure time is detected at the step S800 among the previously stored driving records. Further, at least one destination based on the detected driving records may be detected. Furthermore, an estimated probability with respect to each of the detected destinations may be calculated.

Hereinafter, an operation process of detecting at least one estimated destination and calculating an estimated probability based on the driving record and the detected current time and current location at step S802 will be described in more detail with reference to FIG. 9A.

Meanwhile, the vehicle control device 800 may output information on the estimated destination detected at step S802 (S804). For example, the vehicle control device 800 may output the information on the estimated destination in a form of time information or audio information. In this case, the vehicle control device 800 may display the information on the estimated destination on a windshield glass, or may output the information via a central information display (CID), a cluster, or a display unit of a navigation system provided in the vehicle 100.

Meanwhile, at step S804, the vehicle control device 800 may output the information on the estimated destination according to the estimated probability calculated for each estimated destination. For example, the vehicle control device 800 may display information listing the estimated destinations in descending order of the calculated estimated probability. Alternatively, the vehicle control device 800 may output information on the estimated destinations in descending order of the calculated estimated probability via at least one speaker provided inside the vehicle 100.

In addition, the vehicle control device 800 may detect whether any one of the estimated destinations is selected (S806). For example, the vehicle control device 800 may select any one of the estimated destinations based on a touch input of the driver or a gaze direction of the driver applied to the display unit such as the windshield glass, the CID, the cluster, or the like. Alternatively, the vehicle control device 800 may select any one of the estimated destinations based on a voice information sensed by the driver.

Further, when any one of the estimated destinations is selected at step S806, the vehicle control device 800 may provide path information from the current location to the selected destination (S808).

Meanwhile, the step S806 may be omitted depending on the number of estimated destinations. For example, when the destination detected at step S802 is one, the vehicle control device 800 may output notification information for informing the driver of the current estimated destination at step S804. In addition, the step S808 may be immediately proceeded to provide the driver with path information according to the currently estimated destination. For example, when the estimated destination is one, the vehicle control device 800 may regard the currently estimated destination as having been selected by the driver.

Further, at step S808, the vehicle control device 800 may provide path information according to any one of the estimated destinations. In this case, the vehicle control device 800 may provide the path information based on the location of the vehicle 100 moved by driving of the vehicle 100. In addition, it is possible to detect whether the vehicle 100 is driving on a different path from the currently provided path information (S810). Further, it is possible to determine whether the destination of the vehicle 100 is changed according to a detection result of step S810.

For example, at the step S812, the vehicle control device 800 may determine whether deviation from the path according to the provided path information is a temporary deviation. That is, at the step S810, in a state in which the vehicle drives on another path, when the vehicle returns to a path based on the path information provided by the vehicle control device 800 within a predetermined time, the vehicle control device 800 may determine that the destination has not been changed.

Alternatively, when the path driven by the current vehicle 100 is any one of detours leading to the currently selected destination, the vehicle control device 800 may determine that the destination has not been changed. Therefore, even when the driver drives the vehicle 100 through a detour due to a situation of a specific road section or a specific traffic situation, the vehicle control device 800 may determine that the destination is maintained, and may provide path information based on the detour on which the vehicle 100 is currently driving.

On the other hand, at step S810, the vehicle control device 800 may determine that the destination has changed according to the result of comparing the path information provided from the vehicle control device 800 with a driving path of the actual vehicle 100. For example, when the vehicle 100 does not return to the path according to the path information provided by the vehicle control device 800 within the predetermined time, or when the path driven by the current vehicle 100 is not any one of the detours leading to the currently selected destination, the vehicle control device 800 may determine that the destination has been changed. Then, the vehicle control device 800 may analyze the path on which the current vehicle 100 is driving, that is, the driving path of the vehicle 100, in order to estimate the changed destination (S812).

Here, the step S812 may be a step of analyzing the driving path of the vehicle for the predetermined time. For example, the vehicle control device 800 may detect a driving trajectory of the vehicle, a driving time, and points at which the vehicle 100 is parked or stopped for a predetermined period at step S812, and the detected driving trajectory and time and parking and stop points may be analyzed as the driving path of the vehicle.

In addition, the vehicle control device 800 may estimate the changed destination based on the analyzed path (S814). For example, the vehicle control device 800 may detect driving path records including the analyzed path. Then, the destination according to the path of the current vehicle 100 may be estimated on the destinations extracted from the detected path recordings, and the estimated probability for each estimated destination may be calculated.

Hereinafter, at step S814, an operation process of detecting at least one estimated destination and calculating an estimated probability based on a result of analyzing the driving path of the vehicle 100 will be described in more detail with reference to FIG. 9B.

Meanwhile, when the changed destination estimation and the estimated probability for each estimated destination at step S814 are calculated, the vehicle control device 800 may proceed to step S804 to output the estimated destinations at step S814. In addition, the step S806 may be proceeded, and thus the driver may select any one of the destinations. Then, the vehicle control device 800 may proceed to step S808 to provide path information for the currently selected destination. Further, the step S810 may be proceeded to detect whether the vehicle 100 is driving at a different path from the currently provided path information.

Meanwhile, as described above, when the destination is re-estimated according to the change of the destination, when the re-estimated destination is one, the vehicle control device 800 may proceed immediately to step S808 to provide path information according to the currently estimated destination to the driver. In this case, the vehicle control device 800 may output notification information for informing the currently re-estimated destination to the driver.

Here, in case of the notification information for notifying the re-estimated destination or the notification information including the currently re-estimated destination list, a driving state of the vehicle 100 may be output when the predetermined condition is satisfied. Here, the driving state of the vehicle satisfying the predetermined condition may be a state in which driving of the vehicle 100 is stopped, or may be a state in which the vehicle 100 is driving at a speed lower than the predetermined level. In addition, the driving state may refer to a state in which an object of which possibility of collision is higher than or equal to a predetermined level does not exist among objects detected from the periphery of the vehicle 100.

Figure 9A:
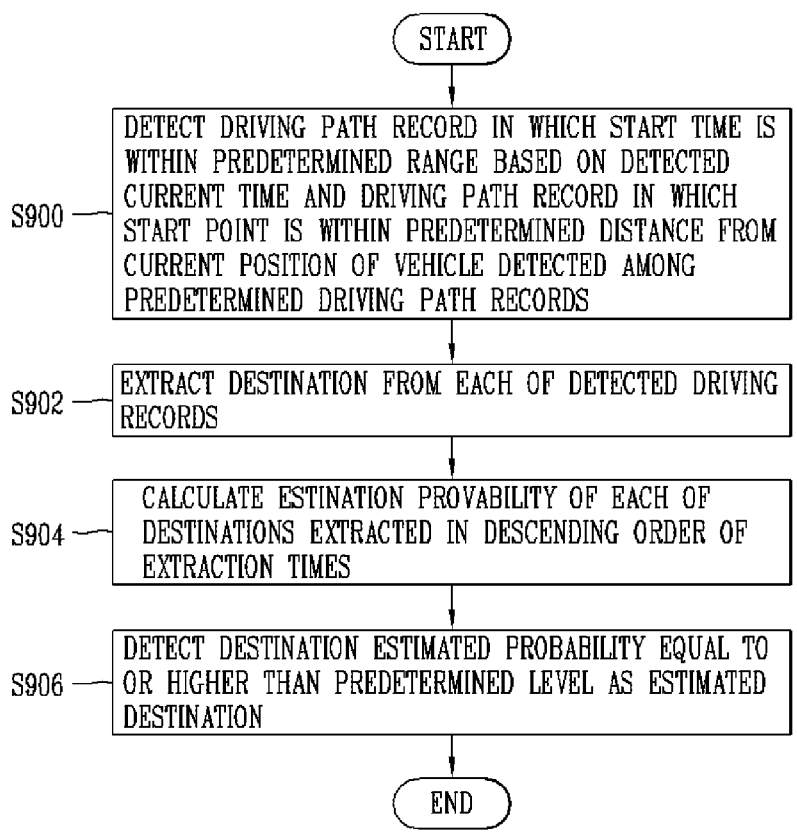
FIG. 9A is a flowchart illustrating an operation process in which a vehicle control device according to an embodiment of the present invention estimates a destination based on a location and a time of the vehicle detected when a vehicle engine is started.

Meanwhile, FIG. 9A is a flowchart illustrating an operation process in which a vehicle control device according to an embodiment of the present invention estimates a destination based on a location and a time of the vehicle detected when a vehicle engine is started.

Referring to FIG. 9A, first, when a current location and a current time of the vehicle 100 at step S800 of FIG. 8 are detected, at least one of previously stored driving path records may be detected based on the current time detected in step S800. For example, the vehicle control device 800 may detect the driving path records in which a departure time of the previously stored driving path records is within a predetermined time range based on the current time detected in step S800. Alternatively, similarly, the vehicle control device 800 may detect at least one of the previously stored driving path records based on the current vehicle location detected at step S800. For example, the vehicle control device 800 may detect the driving path records in which a departure point of the previously stored driving path records is within a predetermined distance from the location of the current vehicle detected at step S800 (S900).

Then, the vehicle control device 800 may extract a destination from each of the detected driving path records (S902). In addition, an estimated probability corresponding to each extracted destination may be calculated according to the order of number of times is extracted (S904).

For example, the estimated probability may be a ratio of each destination to the number of driving path records detected at step S900. For example, when the number of driving path records detected at step 900 is 20, a total of 20 destinations may be extracted by extracting a destination for each path record at step S902. Then, at step S904, the vehicle control device 800 may classify the extracted destinations as the same destination, and calculate the estimated probability according to the classification result. For example, in the extraction result of step S902, when destination A is extracted 12 times, destination B is 7 times, and destination C is once, at step S904, the vehicle control device 800 may calculate an estimated probability of the destination A as 60%, an estimated probability of the destination B as 35%, and an estimated probability of the destination C as 5%.

Meanwhile, the vehicle control device 800 may detect only destinations having the estimated probability of the calculated destination equal to or greater than a predetermined minimum level as the estimated destination (S906). For example, the vehicle control device 800 may set a minimum level of the estimated probability to 10%. In this case, the vehicle control device 800 may detect only the destinations A and B among the extracted destinations A, B, and C In this case, only the destination A and the destination B may be output at the step S804 of FIG. 8, and the destination A may be output prior to the destination B, or the destination A may be output in preference to the destination B in descending order of the estimated probability.

Here, the driving path records may be stored in a memory of the vehicle control device 800. That is, the driving path records may be stored in the vehicle control device 800 instead of a predetermined server according to selection of the driver, and thus the driving path records may be formed so as to be able to prevent a problem of privacy infringement or the like due to storage in the server in advance.

Meanwhile, the driving path records may be stored for each driver of the vehicle 100, respectively. That is, when the driver is different, the vehicle control device 800 may estimate a destination and calculate an estimated probability based on other driving path record information. For this, when the engine of the vehicle 100 is started, the vehicle control device 800 may identify the driver prior to the estimation of the destination. In addition, the driving path record information corresponding to the identified driver may be loaded from the memory of the vehicle control device 800 to detect the estimated destination and to calculate the estimated probability corresponding to each of estimated destinations.

Here, the identification of the driver may be performed in various manners. For example, the identification and authentication of the driver based on biometric information of the driver such as fingerprint. iris recognition, or the like, may be performed. Alternatively, the identification of the driver may be performed based on voice information input from the driver.

Meanwhile, of course, the vehicle control device 800 may assign a weight to each of the driving path records detected at step S902 based on the current time detected at step S800 and the current vehicle location. For example, the vehicle control device 800 may assign a higher estimated probability weight to a destination of which a departure time, among the driving path records detected at the step S900, is extracted from the driving path records closer to a current time detected at step S800. In addition, the vehicle control device 800 may assign a higher estimated probability weight to a destination of which a departure point, among the driving path records detected at the step S900, is extracted from the driving path records closer to a current vehicle location detected at step S800, FIG. 9B is a flowchart illustrating an operation process of pre-estimating a destination according to a result of analyzing a driving path of a vehicle according to an embodiment of the present invention.

Figure 9B:
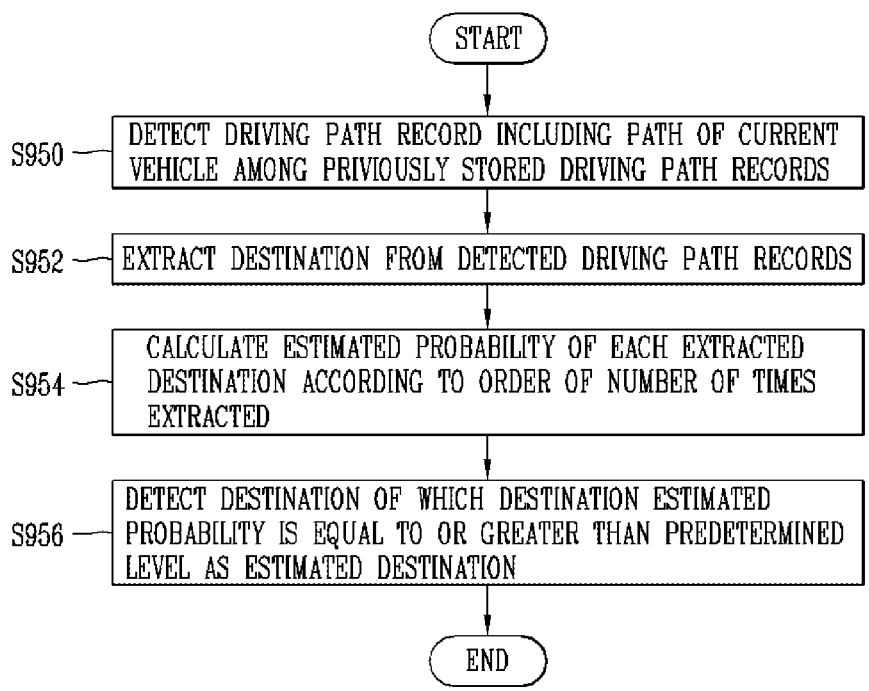
FIG. 9B is a flowchart illustrating an operation process of re-estimating a destination according to a result of analyzing a driving path of a vehicle according to an embodiment of the present invention.

Referring to FIG. 9B, the vehicle control device 800 may detect a driving path record including the result of analyzing the driving path analyzed at step S812 of FIG. 8 among previously stored driving path records (S950). For example, the vehicle control device 800 may detect a driving path record including information on a vehicle driving trajectory for a predetermined time, and points in which the vehicle 100 is parked or stopped.

In addition, the vehicle control device 800 may extract a destination from each of the detected driving path records (S952). In addition, the estimated probability corresponding to each extracted destination may be calculated according to the order of number of times is extracted (S954). For example, the estimated probability may be a ratio of each destination to the number of detected driving path records, as described at step S904 of FIG. 9.

Meanwhile, the vehicle control device 800 may detect only the destinations of which destination estimated probability calculated for each destination at step S954 is equal to or greater than a predetermined minimum level as the estimated destinations (S956). In addition, the vehicle control device 800 may proceed to step S804 of FIG. 8 to output information on the estimated destinations detected at step S956.

Meanwhile, when there is a passenger in the vehicle 100, of course, the vehicle control device 800 according to an embodiment of the present invention may further detect the estimated destination based on a result of identifying the passenger. In this case, a process of detecting the estimated destination according to the passenger may be performed after the destination from the driving path record of the driver through the process of FIG. 9A is estimated. FIG. 10 is a flowchart illustrating an operation process of a vehicle control device 800 according to an embodiment of the present invention.

Referring to FIG. 10, when an engine of a vehicle 100 is started, the vehicle control device 800 according to an embodiment of the present invention may first detect whether a passenger is present in the vehicle 100 together with the driver. Further, when there is a passenger, the vehicle control device 800 may identify the passenger (S1000).

For example, the vehicle control device 800 may determine that a passenger is present when there are two or more passengers in the vehicle 100. Furthermore, the vehicle control device 800 may identify another passenger, that is, the passenger, other than the driver via at least one sensor provided in the vehicle 100.

In addition, the vehicle control device 800 may detect the driving path record when the passenger identified at step S1000 among previously stored driving path records is boarded on the vehicle 100 (S1002). Further, the destination may be detected from each of the driving records detected at step S1002 (S1004).

Then, the vehicle control device 800 may calculate an estimated probability for each of the detected destinations (S1006). Here, the estimated probability calculated with respect to each of the detected destinations may be a process similar to the process described at step S904 of FIG. 9A and step S954 of FIG. 9B. That is, the vehicle control device 800 may calculate a ratio of each destination detected at step S1004 to the number of driving path records detected at step S1002 as the estimated probability corresponding to each destination at step S1006.

Then, the vehicle control device 800 may extract at least a part of destinations according to the estimated probability calculated for each of destinations (S1008). For example, at step S1008, the vehicle control device 800 may extract only destinations having the calculated estimated probability equal to or greater than a predetermined minimum level.

Meanwhile, the vehicle control device 800 may determine whether the extracted destination is included in any one of the destinations estimated from the driving path records of the current driver (S1010). In addition, in a result of the determination at step S1010, when the destination extracted at step S1008 is included in any one of the estimated destinations from the driving path records of the current driver, the estimated probability of the estimated destination corresponding to the currently extracted destination may be weighted (S1012).

Meanwhile, in a result of the determination at step S1010, when the destination extracted at step S1008 is not included in the estimated destinations from the driving path records of the current driver, the vehicle control device 800 may add the detected destination as the estimated destination (S1014). Then, information on the destination extracted at step S1008 may be output as an estimated destination at step S804 of FIG. 8 in order according to the calculated estimated probability.

Meanwhile, in a result of the identification at step S1000, when the passenger is not identified, the vehicle control device 800 may detect the driving path records corresponding to the case in which a passenger is present at step S1002. In addition, the step S1004 may be proceeded to detect the destination from the driving path records detected at step S1002. Further, the estimated probability of the destination may be calculated based on the step S1006 and S1008.

Meanwhile, at step S1010, when the destination extracted from the driving path records according to the unidentified passenger is not included as the estimated destination detected according to the driving path record of the current driver, the vehicle control device 800 may detect the extracted destination as the estimated destination. However, when the extracted destination is included in the estimated destination detected according to the driving path record of the current driver, the estimated probability calculated with respect to the extracted destination may be weighted.

Here, when the passenger is not identified, the weight assigned at step S1012 may have a smaller value than that assigned at step S1012 when the passenger is identified. That is, the vehicle control device 800 may assign different weights at step S1012 according to the result of identifying the passenger at step S1000.

Figure 11:
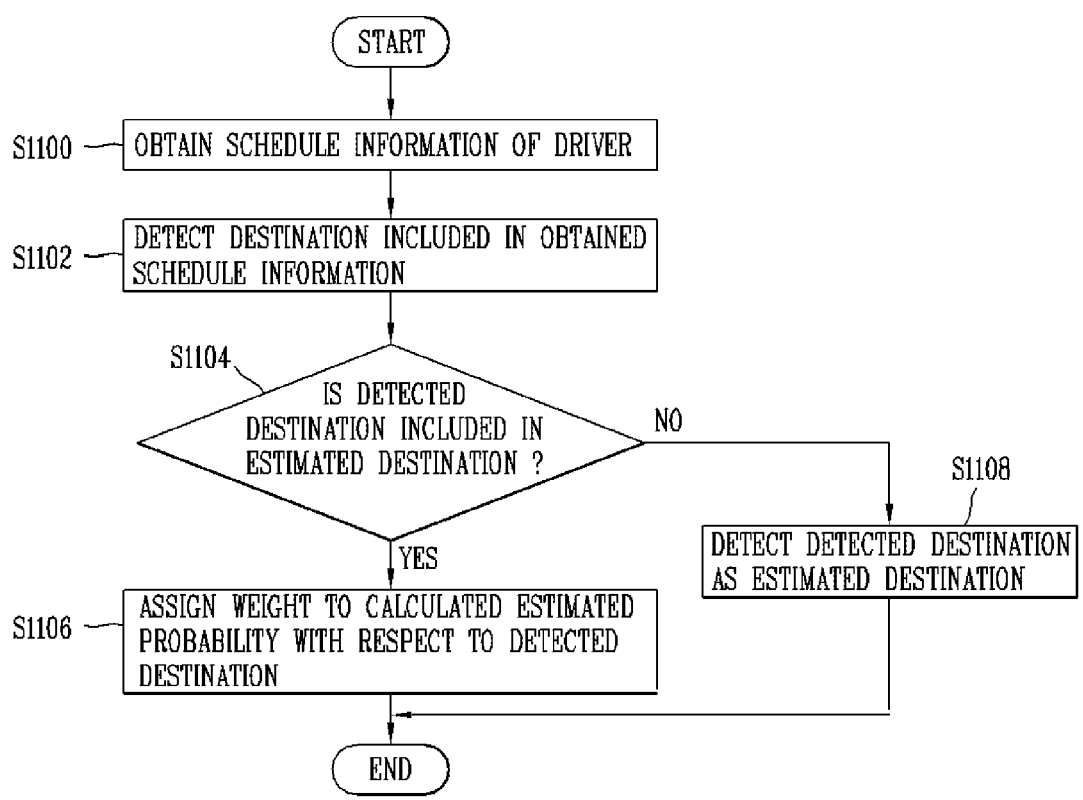
FIG. 11 is a flowchart illustrating an operation process in which a vehicle control device according to an embodiment of the present invention detects an estimated destination based on schedule information of a driver.

FIG. 11 is a flowchart illustrating an operation process in which a vehicle control device according to an embodiment of the present invention detects an estimated destination based on schedule information of a driver.

Meanwhile, when the driver is identified, of course, the vehicle control device 800 according to an embodiment of the present invention may detect the estimated destination based on the schedule information acquired from an identified driver. A process of detecting the estimated destination according to such schedule information may be performed after the destination is estimated from driving path records of the driver through the process of FIG. 9A. FIG. 11 is a flowchart illustrating an operation process of a vehicle control device 800 according to an embodiment of the present invention.

Referring to FIG. 11, the vehicle control device 800 according to an embodiment of the present invention may acquire a schedule information of a driver from an identified driver (S1100). For example, the vehicle control device 800 may acquire the schedule information of the driver from a wearable device worn by the driver or a mobile terminal (S1100).

Then, the vehicle control device 800 may detect the destination from the acquired schedule information (S1102). Then, it is possible to determine whether the destination detected at step S1102 is included in one of the estimated destinations from driving path records of the current driver (S1104).

In addition, in a result of the determination at step S1104, when the destination detected schedule information at step S1102 is included in any one of the estimated destinations from the driving path records of the current driver, an estimated probability of the estimated destination corresponding to the currently detected destination may be weighted (S1106).

Meanwhile, in a result of the determination at step S1104, when the destination detected at step S1102 is not included in the estimated destinations from the driving path records of the current driver, the vehicle control device 800 may add the detected destination as the estimated destination. Then, the destination detected from the schedule information at step S1102 may be output as an estimated destination at step S804 of FIG. 8 in order according to the calculated estimated probability.

Figure 12:
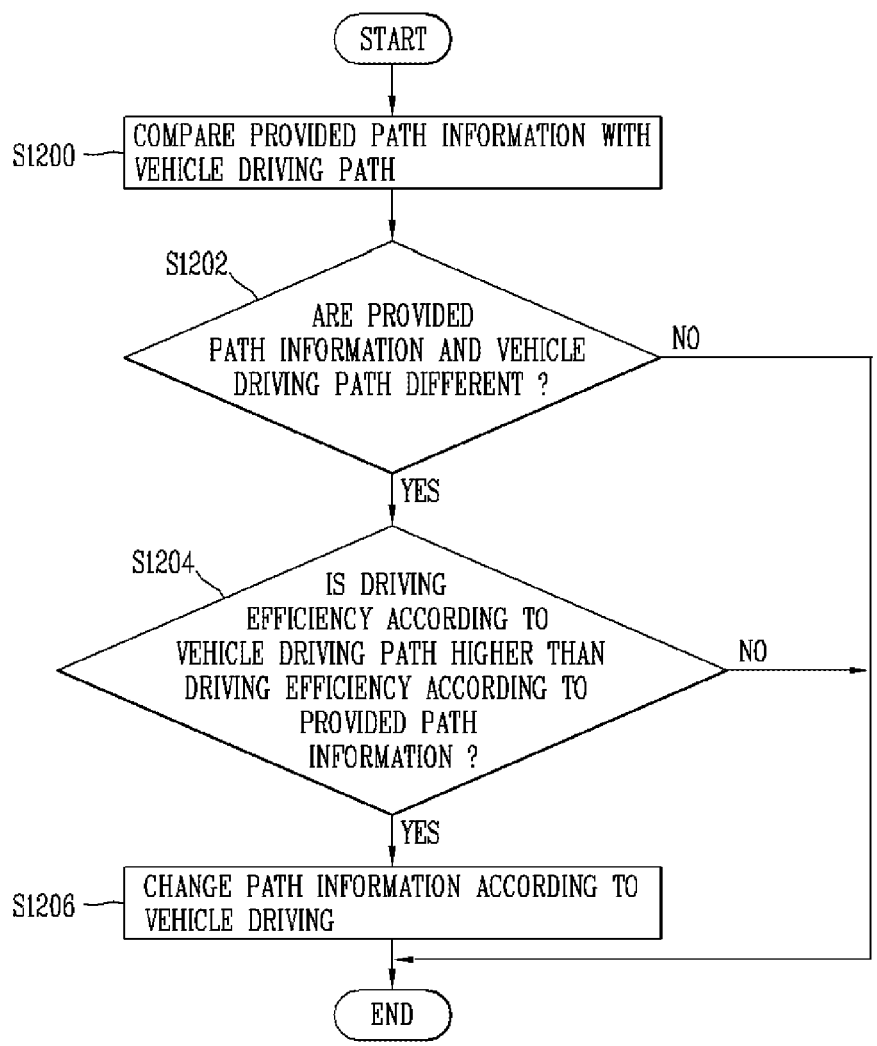
FIG. 12 is a flowchart illustrating an operation process in which a vehicle control device according to an embodiment of the present invention reflects a driving path of a vehicle and changes driving path information.

Meanwhile, when a vehicle 100 reaches the destination, the vehicle control device 800 according to the embodiment of the present invention may store a driving path of the vehicle 100 from a departure point to the destination. In this case, when a driving efficiency degree according to the driving path is higher than that of the path information stored in a path information database, the vehicle control device 800 may change a path from the departure point to the destination according to a currently stored driving path. FIG. 12 is a flowchart illustrating an operation process of a vehicle control device 800 according to an embodiment of the present invention.

Referring to FIG. 12, when driving of the vehicle is completed (for example, when an engine start of the vehicle is turned off), the vehicle control device 800 according to the embodiment of the present invention may determine that the vehicle has reached the destination. Then, the vehicle control device 800 may compare the path information provided to the destination and the driving path of the vehicle actually driven by the vehicle (S1200).

According to a comparison result of step S1200, the vehicle control device 800 may determine whether provided path information and a driving path the vehicle are different (S1202). In addition, when the provided path information differs from the actual vehicle driving path, the vehicle control device 800 may determine whether a driving efficiency degree according to the driving path of the driving path of the vehicle is higher than that according to the provided path information (S1204).

Here, the driving efficiency degree may refer to a measure of whether the driving of the vehicle is more efficient. Here, the driving efficiency degree may be evaluated based on at least one of a time required for driving from the departure point to the destination, a fuel consumption amount, and driving difficulty according to road characteristics from the departure point to the destination.

For example, the driving efficiency degree may be high as the required time required for driving from the departure point to the destination is shorter. In addition, a driving efficiency degree may be high as the amount of fuel required for driving from the departure point to the destination is smaller. Further, the driving efficiency degree may be determined to be high or low according to the driving difficulty determined based on whether the road characteristics are a paved road, an unpaved road, a number including curves angled more than a predetermined angle, or a slope of a road.

Meanwhile, at step S1204, as a result of comparing the driving efficiency degree according to the driving path of the vehicle, when the driving efficiency degree according to the driving path of the vehicle is higher than that according to the path information provided to the current driver, the vehicle control device 800 may change the path information stored in the path information database by reflecting this (S1206). Therefore, when the departure point and the destination according to the driving path of the vehicle are set to be the same, the vehicle control device 800 according to the embodiment of the present invention may provide the changed path information, that is, the path information according to the driving path of the vehicle, to the driver.

Meanwhile, in the following description, examples in which the estimated destination and path guidance information output according to the control of the vehicle control device 800 according to the embodiment of the present invention are output will be described in detail with reference to illustrative views.

First, FIG. 13 is an illustrative view illustrating examples in which, when an engine of a vehicle is started in the vehicle according to an embodiment of the present invention, information on an estimated destination from driving path records is provided to the driver.

In this case, as described with reference to FIG. 9A, at least one of destinations may be estimated from previously stored driving path records based on a current location of the vehicle and a current time, that is, a time at which the engine is started. In addition, information on the estimated destinations based on an estimated probability calculated for each of the estimated destinations may be displayed. (a) of FIG. 13 is a view illustrating an example of such a case.

Referring to (a) of FIG. 13, (a) of FIG. 13 illustrates an example in which notification information 1310 including three estimated destinations 1321, 1322, and 1323 according to an estimated probability from previously stored driving path records is output to a windshield glass (1300). In this case, a vehicle control device 800 may display the estimated destinations in descending order of the estimated probability calculated for each estimated destination as described with reference to FIG. 8. Accordingly, the "A elementary school" calculated with the highest estimated probability may be displayed first with priority over other estimated destinations. In addition, the "C park" calculated with the lowest estimated probability may be displayed last.

Meanwhile, the driver may select any one of the destinations by applying a predetermined input. For example, the driver may select any one of destinations by looking at a specific destination, touching a region in which a specific destination is displayed, or voice. In this case, as shown in (a) of FIG. 13, the vehicle control device 800 may display a currently selected destination (A elementary school 1321) separately from other destinations.

Meanwhile, of course, the driver may cancel the selection of the destination. In this case, the driver may input the destination directly or may drive the vehicle without inputting the destination.

Meanwhile, although (a) of FIG. 13 illustrates an example in which a plurality of estimated destinations are detected, of course, one estimated destination may be detected. Alternatively, the vehicle control device 800 may detect only one estimated destination when any one of the destinations has an estimated probability (for example, 50%) higher than a predetermined level. (b) of FIG. 13 is view illustrating an example in which only one estimated destination is detected.

Referring to (b) of FIG. 13, when the detected estimated destination is one, the vehicle control device 800 may output notification information 1360 for notifying this. In this case, the notification information 1360 may be output in a form of audio information.

Meanwhile, as shown in (b) of FIG. 13, when only one estimated destination is detected, the vehicle control device 800 may provide path information for the estimated destination to the deriver directly.

FIG. 14 is an illustrative view illustrating an example of changing driving path information according to a driving path of a vehicle and providing path guidance based on the changed driving path information in the vehicle according to an embodiment of the present invention.

When driving of the vehicle is completed, as above-described with reference to FIG. 12, the vehicle control device 800 according to the embodiment of the present invention may compare a first path according to path information provided to the driver with second path according to the driving path of the actual vehicle. In addition, when a result of comparing the first path and the second path are not the same, a driving efficiency degree corresponding to each path may be calculated and a calculated driving efficiency degree may be compared. Further, when the driving efficiency degree of the second path, that is, the driving path of the vehicle on which the vehicle actually driven is higher, the path information may be changed by reflecting the second path.

In this case, the vehicle control device 800 may output the path information change notification information 1400 as shown in (a) of FIG. 14. Furthermore, in the future, when the same destination is set at the same departure point (including the estimated destination), as shown in path information 1410 illustrated in (b) of FIG. 14, it is possible to provide the path information according to the changed path to the driver.

Meanwhile, in the above description, a configuration has been described in which a vehicle 100 according to the embodiment of the present invention performs an operation according to the above-described FIGS. 8 to 12 based on the control of the vehicle control device 800. Unlike this, an operation according to FIGS. 8 to 12 may be performed by a control unit 170 of the vehicle 100. In this case, a processor of the vehicle control device 800 may be the control unit 170 of the vehicle 100.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

The invention claimed is:

1. A vehicle control device for controlling a vehicle, the vehicle control device comprising:
   a memory including driving path information of the vehicle; and
   when an engine of the vehicle is started,
   a processor configured to:
     detect at least one piece of first driving path information among the driving path information based on (i) a location of the vehicle and (ii) a time at which the engine is started,
     detect whether a passenger is present in the vehicle,
     based on the passenger being detected, (i) identify the passenger and (ii) detect, based on presence of the identified passenger in the vehicle, second driving path information among the driving path information, calculate an estimated probability for each of first destinations extracted from each piece of the first driving path information and an estimated probability corresponding to each of second destinations extracted from the second driving path information, based on the passenger being identified, assign a first weight to the calculated probability corresponding to each of the second destinations, based on the passenger not being identified, assign a second weight to the calculated probability corresponding to each of the second destinations, the second weight being less than the first weight, and control the vehicle so that at least one of the first destinations and at least one of the second destinations are output as an estimated destination based on the weighted estimated probabilities.

2. The vehicle control device of claim 1, wherein the processor controls the vehicle so that any one piece of path information according to selections of a driver is output among the estimated destinations, and controls the vehicle so that a result of re-estimating a destination according to a result of comparing a driving path of the vehicle to a path according to output path information according to the selections is output.

3. The vehicle control device of claim 2, wherein the processor performs re-estimation of the destination based on the second driving path information including a result of analyzing the driving path of the vehicle among the driving path information.

4. The vehicle control device of claim 3, wherein the result of analyzing the driving path of the vehicle includes information on a driving trajectory of the vehicle for a predetermined time and points in which the vehicle is parked or stopped.

5. The vehicle control device of claim 2, wherein, when driving of the vehicle is completed, the processor compares a first path according to path information output according to a set departure point and a destination and a second path in which the vehicle drives from the set departure point to the destination, and when the first and second paths are different from each other as result of the comparison, based on a driving efficiency degree calculated respectively from the first and second paths, changes path information according to the departure point and the destination to reflect the second path.

6. The vehicle control device claim 5, wherein the processor calculates a driving efficiency degree based on at least one of time required for driving from the departure point to the destination, a fuel consumption amount, or driving difficulty according to road characteristics from the departure point to the destination.

7. The vehicle control device of claim 2, wherein when a state of the vehicle satisfies a predetermined condition, the processor controls the vehicle so that a result of re-estimating the destination is output, and the state of the vehicle that satisfies the predetermined condition is at least one state among a state in which the vehicle is stopped, a state in which the vehicle is operated at a speed lower than a predetermined level, or a state in which an object of which probability of collision is higher than or equal to a predetermined level does not exist among objects detected from periphery of the vehicle.

8. The vehicle control device claim 1, wherein when the estimated destination is one, the processor controls the vehicle so that path information related to the estimated destination together with notification information for notifying the estimated destination is provided.

9. The vehicle control device of claim 1, wherein when the estimated destination is in plural, the processor controls the vehicle so that the plurality of estimated destinations are output in descending order of the estimated probability calculated for each of the plurality of estimated destinations.

10. The vehicle control device of claim 1, wherein when any one of the first destinations has an estimated probability higher than a predetermined level compared with other destinations, the processor may control the vehicle so that only one of the first destinations is output as the estimated destination.

11. The vehicle control device of claim 1, wherein the processor controls the vehicle so that at least one of the first destinations having an estimated probability equal to or greater than a predetermined minimum level is output as the estimated destination.

12. The vehicle control device of claim 1, wherein the processor acquires schedule information of a driver of the vehicle, extracts a destination included in the acquired schedule information, and controls the vehicle so that the extracted destination is further output as the estimated destination.

13. The vehicle control device of claim 1, wherein the processor further outputs detected destination as the estimated destination according to whether the detected destination is included in the estimated destination, or assigns a predetermined weight to an estimated probability of the estimated destination corresponding to the detected destination.

14. The vehicle control device of claim 1, wherein the processor assigns a higher estimated probability weight to a destination of which a departure point or a departure time, among the driving path information, is extracted from the driving path information closer to a location of the vehicle and a time when the engine is started.

15. The vehicle control device of claim 1, wherein the driving path information is stored separately for each driver of the vehicle, and the processor controls the vehicle so that the driver of the vehicle is identified, the estimated destination based on driving path information corresponding to the identified driver is detected, and the detected estimated destination is output.

16. A control method of a vehicle control device for controlling a vehicle, the method comprising:
when an engine of the vehicle is started,
detecting a location of the vehicle and a time when the engine is started;
detecting at least one piece of previously stored driving path information of the vehicle based on the detected location of the vehicle and the time at which the engine is started;
extracting destinations from each of the at least one piece of detected driving path information;
detecting whether a passenger is present in the vehicle,
based on the passenger being detected, identifying the passenger and detecting, based on presence of the identified passenger in the vehicle, second driving path information among the previously stored driving path information;
calculating an estimated probability for each of first destinations extracted from each piece of the previously stored driving path information and an estimated probability corresponding to each of second destinations extracted from the second driving path information;

based on the passenger being identified, assign a first weight to the calculated probability corresponding to each of the second destinations;

based on the passenger not being identified, assign a second weight to the calculated probability corresponding to each of the second destinations, the second weight being less than the first weight; and outputting at least one of the extracted destinations as an estimated destination based on the weighted estimated probability with respect to each of the extracted destinations, and controlling the vehicle so that path information corresponding to any one of the at least one estimated destination is output.

17. The method of claim 16, further comprising:

comparing a path according to the path information with a path at which the vehicle is driven:

according to a path comparison result, analyzing a driving path of the vehicle and extracting driving path information including an analysis result from the previously stored driving path information:

re-extracting destinations from each piece of the driving path information including the analysis result: and controlling the vehicle so that at least one of the re-extracted destinations is re-output as the estimated destination.

* * * * *